Figure 1:
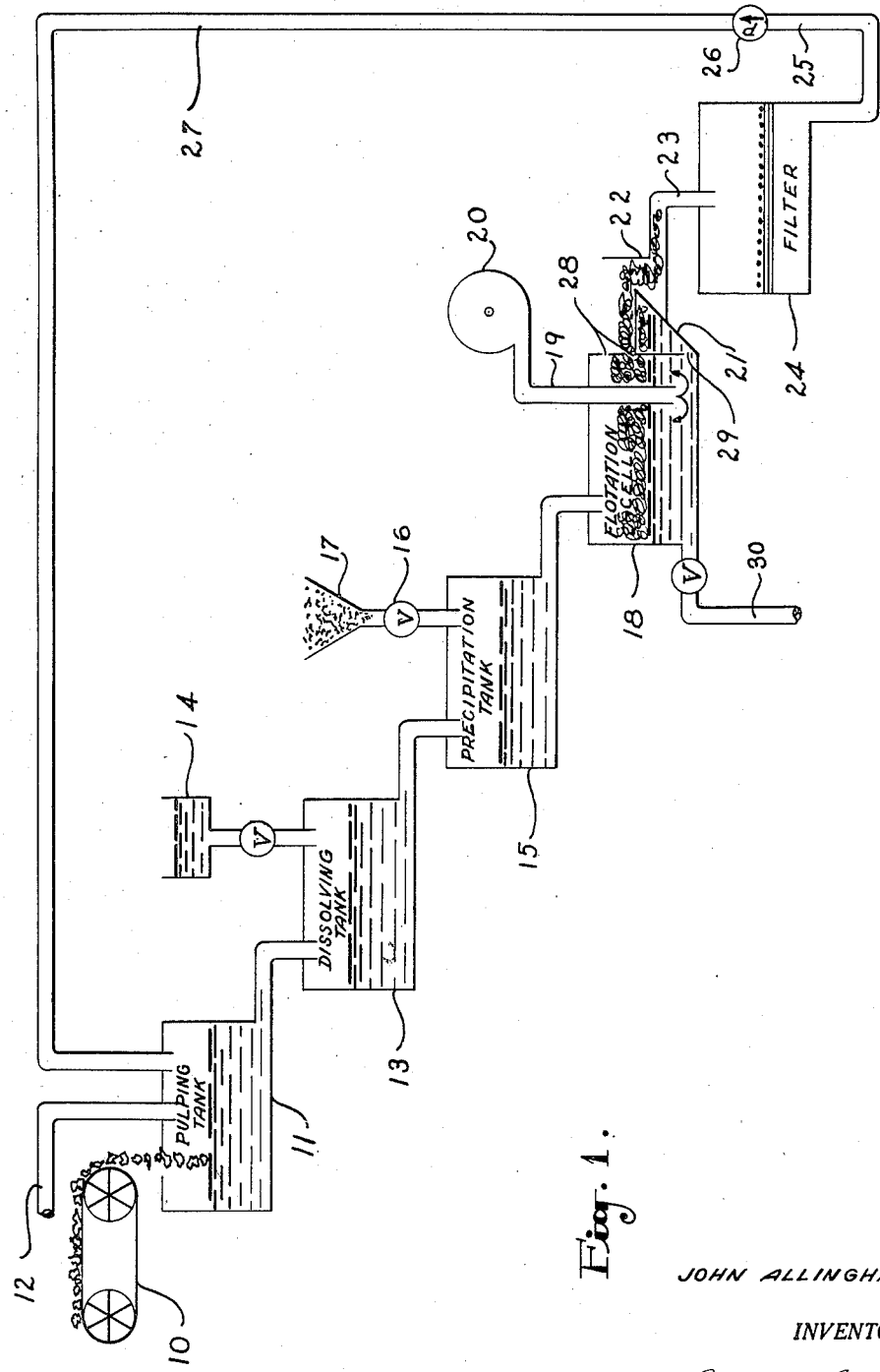

May 11, 1937.  J. ALLINGHAM  2,079,597
METHOD AND MEANS FOR THE RECOVERY OF PRECIOUS METALS
Filed May 28, 1934

JOHN ALLINGHAM
INVENTOR.

BY *Robert W. Fulwider*
ATTORNEYS.

Patented May 11, 1937

2,079,597

UNITED STATES PATENT OFFICE 2,079,597

METHOD AND MEANS FOR THE RECOVERY OF PRECIOUS METALS

John Allingham, Los Angeles, Calif., assignor of one-half to William N. Rossberg, Los Angeles, Calif.

Application May 28, 1934, Serial No. 727,974

24 Claims. (Cl. 75—106)

My invention relates in general to the recovery of precious metals such as gold and silver from the ores with which they are associated in nature and with which they may be associated after other treatment, and is particularly applicable to reworking tailings of cyanidation plants. This application is a continuation in part of my copending application Serial No. 698,724 filed November 18, 1933. Due to the excessive cost of plant equipment and the cost of operation thereof, great trouble has heretofore been experienced in carrying the cyanidation process to the point of recovering all the available precious metals from the ores treated.

Likewise, because of the difficulties arising from treating the slime and the impracticability of properly settling or filtering the slime and the resulting pregnant solution, very little has been accomplished in the matter of reworking tailings of low gold and/or silver content.

To overcome these difficulties, I have devised a process which eliminates the costly filtering step necessary to get maximum recovery of the precious metals, by substituting therefor, a flotation step. Not only has this problem been successfully met, but in so doing I have evolved a class of precipitants that is much more efficient than previously known precipitants for this recovery and one that is particularly effective in weak solvent solutions such as cyanide, "hypo" and the like where the precious metal content in solution is very low.

That precipitation of gold and silver from cyanide solutions is largely due to an electromotive force generated by the galvanic action of the precipitating metals in solution has long been accepted as a fact. Likewise, the action of galvanic couples has been recognized as an aid to precipitation on the theory that an increased electromotive force is generated so that the action becomes similar to the well-known method of electrolysis.

The most widely used precipitant for gold and silver from solutions is zinc, commonly used in the form of zinc dust, which is mixed with the solution. Various other metals and salts of metals have been tried with varying degrees of success, but all of these processes have followed the long accepted method of precipitating and then decanting or filtering. Among the precipitants tried has been carbon in the form of charcoal or coke, but the results obtained were most unsatisfactory. As the result of extensive experiments I have found that various metal-coke and sulphide-coke combinations give excellent results when used as precipitants, which results I attribute largely to the galvanic couple action set up when the precipitant is placed in an electrolyte such as a cyanide pulp solution or "hypo" pulp solution. Furthermore, I have found that these precipitants can be made in a floatable form so that the precipitated gold and silver can be floated out from the pulp, thus eliminating the necessity of providing expensive filtration or decantation systems.

Referring now to the drawing where Fig. I shows a schematic arrangement of equipment suitable for practicing my invention, we have a conveyor belt 10 which feeds the ore or tailings into a pulping tank 11, to which water is added by means of a pipe 12. Any convenient means for breaking up the ore and causing it to go into solution and/or suspension can be used. When the ore and water is properly mixed as say for instance to give a pulp containing approximately 50% of solids, it is passed to a second tank numbered 13. This may be by gravity as shown. Above this tank which we will call the dissolving tank we may provide a reservoir 14 of cyanide solution or other suitable solvent. The solvent from this reservoir is fed into the dissolving tank continuously, but slowly. The pulp is kept agitated in the tank 13 by means not shown and is allowed to remain there long enough to allow as much as practical of the gold and silver to become dissolved by the solvent. In some tailings a satisfactory portion of the gold and silver is in the form of soluble salts and in this case, of course, no additional solvent is needed.

From the dissolving tank 13 the solution flows to a precipitating tank 15, into which the precipitant can be introduced as by means of the pipe 16 leading from a bin or hopper 17 located above the precipitation tank 15. The solution in this tank 15 is also agitated to insure a thorough mixture of the precipitant throughout the solution. As will be explained in detail hereafter, the gold and silver are precipitated directly on the precipitant which, as previously mentioned is floatable in the pulp solution and is also floatable after gold and silver are precipitated thereon. From the precipitation tank 15 the pulp containing the precipitant carrying precipitated gold and silver is led to a flotation cell of any suitable type such as the one shown consisting of a frothing tank 18 having a vertical pipe 19 leading downwardly thereinto from a compressor 20. A small quantity of frothing agent is added as for instance from one-tenth to one-fourth pound of pine oil per ton of ore and compressed air is forced down through the pipe 19 to agitate the solution in frothing tank 18. The froth containing the precipitant and its burden of precious metals flows out through the openings 28 into an overflow chamber 21, and thence into a launder 22, any excess of solution flowing over through openings 28 returning to the tank 18 by aperture 29. From the launder 22 the froth flows through a pipe 23 to a filter 24 which may be of any well known type. The filtrate is carried back to tank 11 by means of pipes 25 and 27 and pump 26. The concentrate is collected periodically and treated by smelting or other known means not shown to separate the gold and silver from the precipitant and such other materials as have frothed over. The pulp from the frothing tank 18 is carried by pipe 30 to a tailing dam not shown.

It is to be understood that by the foregoing brief description of the suitable apparatus for operating my process, I do not intend to limit myself to the arrangement shown and it will be obvious that the size, shape, design, number, and order of tanks, the means of charging them and the means of agitation and flotation may be varied in innumerable ways.

The exact arrangement of physical apparatus is immaterial so long as it provides means for making a suitable pulp, means for dissolving the precious metals (if needed), means for precipitating the precious metals, and means for floating off the precipitant used with its burden of precious metal.

I have found that powdered or finely ground carbon either in the form of coke, charcoal or coal dust, is eminently satisfactory as a precipitant body, for if properly prepared, the carbon is readily flotable on the pulp. However for best results the carbon should be in granular form and not too powdery, such for example as lampblack, which I have found does not have nearly the efficiency of the more granular forms such as coke. In my invention the carbon serves a two-fold purpose, first it acts as a carrier or flotation medium for the active precipitating metal and the subsequently precipitated precious metals, and second, it cooperates with the precipitating metal to form a galvanic couple which produces an increased electromotive force aiding the precipitation of the gold and silver. While all forms of carbon, if properly ground, will function in my invention, I find that coke is the most satisfactory and I will therefore confine the following illustrative examples to those involving this form of carbon.

It is essential to the most efficient operation of my process that the coke particles and the precipitating metal particles be in intimate contact and that so far as possible every metallic particle be carried by a coke particle. When this condition obtains the maximum possible voltage due to metal-coke couples becomes available. This can be accomplished to a certain extent by grinding the coke and the metal particles together where the size of the metal particles is so small as to be known in the art as dust, as for instance zinc dust.

However, I prefer to accomplish the union between the coke particles and the precipitating metal particles by heating the ground coke with metallic oxides or metallic salts such as carbonates, sulphates, and the like. By properly regulating the size of the particles, the temperature and the time of heating, I am able to get a resulting precipitant composed of minute carbon particles either impregnated with or carrying in intimate contact one or more minute particles of the precipitating metal and/or its sulphides.

The following are some examples of excellent precipitants formed in this manner, all of which demonstrate a couple action:

*Example #1*

Coke ground to pass 100 mesh is mixed with zinc oxide in the proportion of nine parts of coke to one part of zinc oxide (by weight), and the mixture is heated for about thirty minutes or more depending upon the quantity at a temperature suitable for the reduction of the zinc oxide in the presence of carbon. This temperature is preferably such that some fuming of the zinc will take place and after it has gone on for about ten minutes, the mixture is cooled and is ready for use. By the time the mixture has fumed for a short while, the coke particles have become thoroughly impregnated and united with liquid or vaporized zinc which upon cooling forms minute particles of solid zinc united with the coke particles. It will be understood, of course, that the precipitant can be formed to a certain extent by reduction of the zinc with little or no fuming. Using eight pounds of this precipitant per ton of ore treated in a solution having approximately .015% free cyanide and .02 oz. gold per ton I was able to make a recovery of between 85% and 95% of the gold content with a contact time of forty-five minutes. In this connection it should be noted that commercial grades of zinc oxide give better results than C. P. oxide.

*Example #2*

Finely ground coke mixed with zinc sulphate in the proportion of nine parts coke to one part zinc sulphate when heated to a temperature of between 700° and 800° C. and held there for from thirty to forty-five minutes will produce an excellent precipitant for silver, but the results with gold are not as good as obtained by the precipitant of Example #1. The zinc sulphate of this example is reduced to zinc sulphide, particles of which adhere to and become impregnated in the coke particles. Some free zinc may also be formed but the precipitant is largely zinc sulphide and coke.

*Example #3*

A mixture of nine parts of finely ground coke to one part of copper carbonate containing a little sodium sulphate when heated at 800° C. for forty-five minutes also gives a good precipitant. The copper carbonate is reduced to free copper by the carbon, and at the same time the sodium sulphate reacts with some of the carbon present to form sodium sulphide, which reacts with portions of the copper carbonate, the intermediate product copper oxide, and some of the free copper of reduction to form copper sulphide. The resulting precipitant obtained by cooling the treated mixture is then a plurality of coke particles having smaller particles of free copper and copper sulphide impregnated therein and united thereto, so that a double couple is formed. Tests have been run on this form using tailings containing only .025 oz. soluble gold per ton with a .03% cyanide solution and the recovery has run as high as 98.5% with forty-five minutes contact.

*Example #4*

A mixture of coke and copper sulphate treated as in Example #3 also makes a good precipitant. In this regard it is found that if the mixture is only heated to from 400° to 500° C. that the result is a combination of metallic copper and copper sulphide, whereas at a higher temperature of say 800° C., the result is almost all copper sulphide. Using this precipitant in a pulp solution having .016% free cyanide and using eight pounds of precipitant per ton of ore, a sixty-five percent recovery of gold was obtained with a forty-five minute contact. However, a much higher recovery of silver was obtained.

In all of the examples cited, I account for the increased efficiency of the precipitant over that secured by grinding dry metal with carbon, by the fact that during the reduction of the metal salts to free metal and/or its sulphides, the highly porous coke is impregnated with the free metal and/or sulphide to give an intimate contact therebetween. Consequently the solution may be well agitated in the precipitating tank without causing the coke particles to lose their metallic burden, thus insuring a continuous couple action throughout.

While the exact action of the sulphide has not as yet been determined, it would by analogy seem that the sulphide particles in union with the carbon particles form a sulphide-coke couple similar in action and effect to the zinc-coke and copper-coke couples formed, thus giving us an increased potential favorable to the deposition of gold and silver. This is the simplest explanation of the action, although a more complex relationship between the metal and/or its sulphide, and the carbon may exist. However, substantiation is given to this theory when we consider that coke gives better results than charcoal, and that coke has sulphur present in it, whereas charcoal does not. This being true, it is logical to assume that in the heating of the coke and the metallic salt some metal sulphide is formed, which accounts for the increased efficiency noted by producing an additional couple which raises the total electromotive force available for precipitation.

As mentioned before, thiosulphate or "hypo" can often be used as a solvent in place of cyanide which, of course, is desirable because of the decrease in cost. I have found that in the tailings of certain cyanide dumps most of the gold and silver is in the form of salts of cyanide which are soluble in hypo. Also it has been found that in tailings from the patio process which contain copper and mercury as well as gold and silver that the latter are substantially soluble in hypo. In all cases where hypo is used as a solvent the precipitants previously described can be used to advantage, particularly the zinc-coke precipitants.

In the treatment of patio tailings I have found, however, that a cheaper method can be used involving a double precipitation. An iron-coke precipitant is formed by heating iron oxide and coke for about one hour at 900° C. to insure reduction of the oxide to iron so that we can get an iron-coke couple. This precipitant is then added to the pulp previously dissolved in hypo and the copper and mercury are precipitated on the iron. In turn these metals form copper-coke and mercury-coke couples which precipitates the gold and silver. The pulp solution can then be frothed and floated as previously described.

While I have confined my illustrations herein to zinc-coke and copper-coke precipitants (except for the iron-coke for indirect recovery), it is for the reason that they are the most economical and efficient to use and it will be readily understood that my process comprehends the use of any metal which will displace gold and silver, or which will form with carbon a couple that will cause them to precipitate out of solution. Some of the other metals that can be used in my process but which are not as practical are for example aluminum, nickel, cadmium, tin and various sulphides not mentioned.

It will also be understood that I do not limit myself to the temperatures, quantities and proportions herein set forth, for there are so many different gold bearing ores in different localities, each with its individual constituents, that the practice of my invention will of necessity have to vary considerably with the particular ore being treated. However, it is felt that with the foregoing description of the principles involved, and with the examples given that those skilled in the art will be able to readily make such adjustments as become necessary for a proper and efficient operation of my invention.

I claim as my invention:

1. In a process for recovering precious metals from ores the steps of: dissolving said precious metals; adding a precipitant to said solution comprising small particles of carbon floatable on said solution when the same is frothed, and minute particles of metal in intimate contact therewith; causing said precipitant to permeate said solution; causing said precipitant to rise to the top of said solution by frothing said solution; and floating said precipitant off from said solution.

2. A process for recovering precious metals from ores which includes: making a flowable pulp of said ores; adding a solvent to said pulp to dissolve the precious metals; adding a precipitant to said pulp comprising particles of coke carrying small particles of zinc; causing said precipitant to rise to the top of said pulp; floating said precipitant off from said pulp; and separating the precious metals from the precipitant.

3. A process for the recovery of precious metals from a pulp containing solution thereof which includes: mixing into said solution a precipitant comprising particles of carbon carrying smaller particles of a metal more electropositive than gold, said carbon particles being so small that when said solution is frothed they will float thereon; agitating and frothing said solution; and floating said precipitant and its burden of precipitated gold and silver off from said solution.

4. A process for the recovery of precious metals from a pulp containing solution which includes: adding a precipitant comprising small particles of carbon carrying smaller particles of a metal more electropositive than silver; adding a flotation agent to said solution; agitating and frothing said solution; and floating said carbon particles with their burden of precious metals off from said solution.

5. A process for the recovery of precious metals from a pulp containing solution which includes: adding a precipitant comprising small particles of carbon carrying smaller particles of zinc; adding a flotation agent to said solution; agitating and frothing said solution; and floating said carbon particles with their burden of precious metals off from said solution.

6. A process as defined in claim 1 in which the carbon particles are in the form of coke.

7. A process as defined in claim 1 in which the metal in intimate contact with said carbon particles is zinc.

8. A process as defined in claim 1 in which the metal in intimate contact with said carbon particles is copper.

9. A process as defined in claim 1 in which the carbon particles are in the form of coke and the metal in intimate contact therewith is zinc.

10. A process as defined in claim 1 in which the carbon particles are in the form of coke and the metal in intimate contact therewith is copper.

11. A process as defined in claim 1 in which the carbon particles are in the form of coke and there are also in intimate contact therewith minute particles of the sulphide of a metal which will displace gold from said solution.

12. A process as defined in claim 3 in which the particles of carbon are in the form of coke.

13. A process as defined in claim 4 in which the particles of carbon are in the form of coke.

14. A process for the recovery of precious metals from a pulp containing solution thereof which includes: adding a precipitant to said solution comprising small particles of carbon carrying smaller particles of the sulphide of a metal more electropositive than gold; adding a frothing agent to said solution; agitating and frothing said solution; and floating said carbon particles with their burden of precious metal off from said solution.

15. A process as defined in claim 14 in which the carbon particles are in the form of coke.

16. The process of recovering precious metals from a pulp containing solution thereof which includes: adding a precipitant comprising a carbon couple to said solution which will displace said precious metals from solution and cause them to precipitate upon said precipitant; frothing said solution; and floating said precipitant with its burden of precious metal off from said solution.

17. A precipitant for use in the recovery of precious metals from a pulp containing solution which comprises: particles of finely divided carbon small enough to be readily floated on said pulp solution of precious metals when the same is frothed, said carbon particles carrying in intimate contact therewith minute particles of a metal which will displace gold.

18. A precipitant as defined in claim 17 in which the carbon particles are in the form of coke.

19. A precipitant as defined in claim 17 in which the metal carried by said carbon particles is zinc.

20. A precipitant as defined in claim 17 in which the metal carried by said carbon particles is copper.

21. A precipitant as defined in claim 17 in which the carbon particles are in the form of coke and the metal carried thereby is zinc.

22. A precipitant as defined in claim 17 in which the carbon particles are in the form of coke and the metal carried thereby is copper.

23. A precipitant for use in the recovery of precious metals from solution which comprises: particles of finely divided carbon small enough to be readily floated on a pulp solution of precious metals when the same is frothed, said carbon particles carrying in intimate contact therewith minute particles of the sulphide of a metal which will displace gold from said solution.

24. Precipitant as defined in claim 23 in which the carbon particles are in the form of coke.

JOHN ALLINGHAM.